United States Patent
Shin

(10) Patent No.: US 9,594,733 B2
(45) Date of Patent: Mar. 14, 2017

(54) PROGRESS BARS SHOWING DOWNLOAD PROGRESS OF OBJECTS OF A WEB PAGE AND THUMBNAILS INDICATING WHERE ON THE WEB PAGE THE OBJECTS IS GOING TO BE DISPLAYED

(71) Applicant: Samsung Electronics Co., Ltd., Gyeonggi-do (KR)

(72) Inventor: Taiho Shin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 177 days.

(21) Appl. No.: 14/063,040

(22) Filed: Oct. 25, 2013

(65) Prior Publication Data
US 2014/0122998 A1 May 1, 2014

(30) Foreign Application Priority Data
Oct. 30, 2012 (KR) .................. 10-2012-0120877

(51) Int. Cl.
G06F 17/30 (2006.01)
G06F 17/22 (2006.01)
H04L 29/08 (2006.01)

(52) U.S. Cl.
CPC .......... *G06F 17/2247* (2013.01); *G06F 17/30* (2013.01); *G06F 17/30905* (2013.01); *H04L 67/02* (2013.01)

(58) Field of Classification Search
CPC .............................. G06F 17/30; G06F 17/2247
See application file for complete search history.

(56) References Cited

U.S. PATENT DOCUMENTS

| | | | |
|---|---|---|---|
| 6,269,403 B1* | 7/2001 | Anders | H04L 29/06 709/219 |
| 8,418,068 B1* | 4/2013 | Backus | H04N 1/00167 345/619 |
| 2005/0102631 A1 | 5/2005 | Andreas et al. | |
| 2010/0100800 A1 | 4/2010 | Cote et al. | |

(Continued)

OTHER PUBLICATIONS

Walter Robinson II, "Software for Safe Searching" Copyright 2003, p. 5, http://www.lastchanceministries.com/software_for_safe_surfiing.htm archived from https://archive.org/web/.*
South China Morning Post May 21, 1998, "Inexpensive add-ons can enrich browsing time." pp. 1-2.*
DynamiX Labs, "an example of image loading" http://www.dynamixlabs.com/example-load.html, archived from https://archive.org/web/ on Jan. 12, 2010. pp. 1-3.*

(Continued)

*Primary Examiner* — Cesar Paula
*Assistant Examiner* — Benjamin Norris
(74) *Attorney, Agent, or Firm* — Cha & Reiter, LLC

(57) ABSTRACT

Methods of receiving and displaying a server page and information thereof in an electronic device, particularly a wireless device operating in a slow communication channel. Data representing portions of a plurality of objects included in the page are initially received. Progress bars individually showing reception progress states of the received objects are generated and displayed. User inputs may be receivable for either canceling reception of a particular object, or allowing reception of an object while automatically canceling reception of other objects. The methods thus speed up the process of receiving desired information, particularly during a slow communication channel.

18 Claims, 9 Drawing Sheets

(56) References Cited

U.S. PATENT DOCUMENTS

| | | | |
|---|---|---|---|
| 2010/0313159 A1* | 12/2010 | Decker | H04L 67/02 |
| | | | 715/772 |
| 2011/0131521 A1 | 6/2011 | Cho et al. | |
| 2012/0023487 A1* | 1/2012 | Letca | G06F 11/3466 |
| | | | 717/130 |
| 2012/0072871 A1 | 3/2012 | Seo et al. | |
| 2012/0209969 A1 | 8/2012 | Cheng et al. | |
| 2014/0063174 A1* | 3/2014 | Junuzovic | G06Q 10/101 |
| | | | 348/14.02 |

OTHER PUBLICATIONS

PC review, "graphical representation (little color-coded bars) of each element of a webpage as its being downlo" Oct. 16, 2005. http://www.pcreview.co.uk/threads/graphical-representation-little-color-coded-bars-of-each-element-of-a-webpage-as-its-being-downlo.2190168/, p. 1.*

Walter Robinson II, "Software for Safe Surfing", http://www.lastchanceministries.com/software_for_safe_surfiing.htm, Copyrighted 2003, p. 5.*

South China Morning Post Newpaper Ltd. May 21, 1998 (hereinafter, "Morning Post"), p. 1.*

Introduction to Firebug: Net Panel—Software is hard, May 7, 2009, pp. 1-15, XP055132327, http://www.softwareishard.com/blog/firebug/introduction-to-firebug-net-panel/.

Net Panel—FirebugWiki, May 2, 2012, pp. 1-6, XP055132402, http://getfirebug.com/wiki/index.php?title=Net_Panel&oldid=6952.

* cited by examiner

PROGRESS BARS SHOWING DOWNLOAD PROGRESS OF OBJECTS OF A WEB PAGE AND THUMBNAILS INDICATING WHERE ON THE WEB PAGE THE OBJECTS IS GOING TO BE DISPLAYED

CLAIM OF PRIORITY

This application claims the benefit under 35 U.S.C. §119(a) of a Korean patent application filed on Oct. 30, 2012 in the Korean Intellectual Property Office and assigned Serial No. 10-2012-0120877, the entire disclosure of which is hereby incorporated by reference.

BACKGROUND

Technical Field

The present disclosure relates generally to receiving and displaying server and web pages.

Description of the Related Art

Portable wireless terminals (herein, "terminals" or "electronic devices") such as smartphones and tablet PCs have proliferated on the strength of support of hardware and software which can provide various contents as well as an enlarged touch screen size. Conventional portable terminals have various communication modules therein and support communication services based on the communication modules. Typical portable terminals have mobile communication modules to support mobile communication functions and support a telephonic communication service, a message service, and a data service based on the corresponding mobile communication modules. Further, due to the development of data service technologies, terminals currently receive contents produced by various servers and provide data services such as web surfing and email.

Meanwhile, even though portable terminal communication technologies have been rapidly developed, the speed at which data is wirelessly transmitted is still generally low in comparison with wired-based communications. Accordingly, a conventional portable terminal often requires considerable time to load and display web pages being received. Particularly, when the corresponding web page includes a large capacity object, such as a video or audio object, the page load time significantly increases, thus inconveniencing the user.

SUMMARY

Embodiments described herein enable the selective reception of objects within a server page which can support faster identification of information desired by a wireless terminal end user. Page switching is facilitated by supporting an operation of the server page on the basis of objects.

The present disclosure provides methods of receiving and displaying a server page and information thereof in an electronic device, which can be particularly advantageous for a wireless device operating in a slow communication channel. Data representing portions of a plurality of objects included in the page are initially received. Progress bars individually showing reception progress states of the received objects are then generated and displayed.

In various embodiments, user inputs may be receivable for either canceling reception of a particular object, or allowing reception of an object while automatically canceling reception of other objects. The embodiments may thus speed up the process of receiving desired information, and are particularly suitable for improving performance in a slow reception channel.

In accordance with an aspect of the present invention, an electronic device supporting an operation of a server page is provided. The device includes a communication unit for receiving each of a plurality of objects included in the server page; a display unit for displaying partial process bars individually showing reception progress states of the received objects; and a controller controlling the display of a plurality of items representing the objects associated with the partial progress bars.

In accordance with another aspect, a method of operating a server page is provided. The method includes receiving each of a plurality of objects included in the server page; and displaying partial progress bars individually showing reception progress states of the plurality of received objects.

In accordance with still another aspect, a method of operating a server page is provided. The method includes receiving the server page including a plurality of object address information; and outputting progress bars individually showing progress states of the plurality of objects to areas on the server page to which the objects are to be output. Implementations may exhibit one or more of the following advantages and effects:

Easy identification of a reception state of an individual object may be supported by implementing loading of the server page on the basis of objects.

Also, a more rapid implementation of the server page is possible by commanding that only a particular object is received or reception of the particular object is automatically or manually stopped in the server page operated on the basis of objects, and accordingly, this supports faster switching to another page.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION

Hereinafter, exemplary embodiments of the present invention are described in detail with reference to the accompanying drawings, in which like reference elements denote like elements or features. In this description, a detailed description of technologies which are known in the art or are not directly related to the present invention may be omitted. Further, a detailed description of components having the same structures and processes in substance may be omitted. It is to be noted that some components shown in the accompanying drawings may be exaggerated, omitted or schematically illustrated, and the size of each component may not exactly reflect its actual size. Accordingly, the present invention is not limited by the relative size or interval shown in the accompanying drawings.

Herein, a "terminal" is a wireless electronic communication device that can be portable or fixed. As used herein, the terms "terminal", "electronic device", and "device" are synonymous and used interchangeably. Examples of terminals include but are not limited to smartphones, tablet PCs, notebook computers, cell phones, cameras with wireless communication capability, digital broadcasting receivers, music players, and so forth.

Herein, the term "unit" can mean component, part, or device.

Herein, "page" is used to mean server page or webpage. "Server page" is a page generated by a server.

As used herein, phrases such as "receiving an object" can mean receiving the complete data or a portion of the data constituting that object. Phrases such as "partially receiving an object" mean receiving only a portion of the data constituting the entire object. The phrase "amount of an object" and like forms means the amount of data representing that object. For instance, "amount of an object received" means the amount of data or the percentage of the total data comprising the complete object which has been received.

Figure 1:
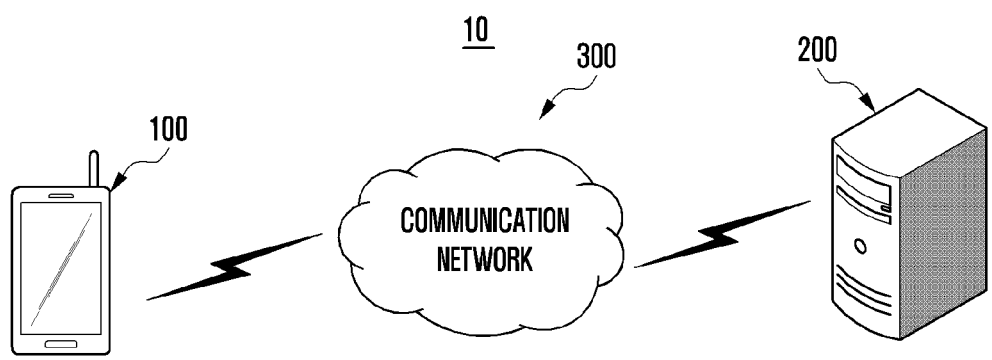
FIG. 1 is a diagram schematically illustrating a configuration a server page providing system according to an embodiment of the present invention.

FIG. 1 is a diagram schematically illustrating a configuration of a server page providing system, 10, according to an embodiment of the present invention. Server page providing system 10 includes a server 200, a communication network 300, and a terminal (device) 100. Communication network 300 can be the Internet, in which case server pages provided by server 200 are web pages, i.e., World Wide Web pages. Other communication networks, such as private networks, are also contemplated.

The server page providing system 10 supports provision of a server page pre-generated by the server 200 to the terminal 100 through the communication network 300. Server 200 transmits the page to the terminal 100 as a data unit that includes a set of objects. As described later, terminal 100 supports provision of a reception state of each of the received objects. Terminal 100 can be configured to allow a user to select prioritized or exclusive reception of at least one particular object of the set of objects, before complete data reception of all the objects. In another implementation, reception of only data of selected objects is supported according to a prearranged setting. In another embodiment option discussed later, only objects designated by the user are received. That is, during a time of reception progress for multiple objects, terminal 100 may be provisioned to allow the user to select an object for which the reception operation is to continue, whereby reception of non-selected objects is caused to automatically cease. In this manner, the user need not wait until non-selected objects are received before performing an operation relevant to the selected objects. Also, the selected objects may arrive faster than they would otherwise, because the processing task of the terminal 100 is simplified, and socket connections with non-selected objects are closed, freeing up network bandwidth for the selected object(s).

Each object may include predetermined address information to configure the server page, for example, particular address information such as URL address information. The address information may be absolute address information or relative address information between the objects. As described in further detail below, the server page providing system 10 allows the user to receive the server page in a form desired by the user among various forms according to at least one scheme. Thereby, the problem of inefficient data reception standby time to wait for an entire server page to load can be resolved by appropriate selection of objects.

The server 200 has a configuration of producing and providing the server page as described above, and may be a web server connected in the Internet. Accordingly, the server 200 accesses the Internet and also a mobile communication system to support wireless transmission of data comprising the server page to the accessed terminal 100. Particularly, the server 200 may provide the page in a form of Hypertext Markup Language (HTML), or in a form of Hypertext Transfer Protocol (HTTP) or HTTPS. The page provided by server 200 may be configured by placing a plurality of objects on one or more areas partitioned by templates. Here, the plurality of objects may include text, an image, and/or audio data, and images may be still image or videos. In the page provided by server 200, HTML data which describes the page and respective objects may be provided in parallel according to routes thereof. To this end, different socket connections at the terminal are established to receive the objects in parallel.

The communication network 300 can support formation of a communication channel between the server 200 and the terminal 100. When the terminal 100 is implemented to include a mobile communication module and the server 200 is implemented to access the Internet through a wired connection, the communication network 300 includes a mobile communication network apparatus and an Internet network apparatus for forming the communication channel between the server 200 and the terminal 100, and includes a gateway for connecting the mobile communication network apparatus and the Internet network apparatus. Further, when the terminal 100 is made to provide an access to the Internet through a wireless access point, the communication network 300 basically includes the Internet network apparatus and may be configured to include wired/wireless access points according to access types of the terminal 100 and the server 200. As described above, the communication network 300 utilized in embodiments herein forms a communication channel for transmitting the server page between the terminal 100 and the server 200 and may be implemented in at least one of various forms in which the server 200 can provide the page to terminal 100. Meanwhile, in a process in which the server 200 transmits the page to terminal 100 and then terminal 100 receives the page from server 200, the communication unit 300 can transmit a corresponding object cancel request message with respect to an object of which reception is canceled to server 200. Thereby, network traffic between server 200 and terminal 100 is reduced, which can result in a faster transfer of the desired objects in a prioritized fashion.

The terminal 100 performs an access to the server 200. When the access is successful, the terminal 100 can receive and output the page produced by the server 200. During this process, the terminal 100 can receive the page produced by the server 200 in the predetermined unit of objects in parallel. Particularly, the terminal 100 performs the access to the server 200 based on HTTP and receives various objects included in the server pages, for example, HTML data including description information on each of the objects included in the page, a template defining sections of the page, and at least one object placed on each section defined by the template from server 200. At this time, the terminal 100 can individually generate and operate protocol routes (e.g., TCP, UCP or raw IP protocols) and socket routes for receiving respective objects in order to receive the objects in parallel. Particularly, the terminal 100 according to the present invention obtains and displays information on reception states of the respective objects, allowing the user to cancel reception of at least one object, or allowing for object reception cancellation through a prearranged setting. When an input event for canceling a particular object is generated, the terminal 100 can cancel the reception of the object by releasing the protocol routes and socket routes generated to receive the corresponding object and remove already received data thereof from the entire data of the page. The user of the terminal 100 according to the present invention can reduce the number of objects which should be totally received by canceling the reception of at least one object, and accordingly construct the received page by using the smaller number of objects, so that it is possible to more rapidly output (i.e., display and play audio of) the page.

Figure 2:
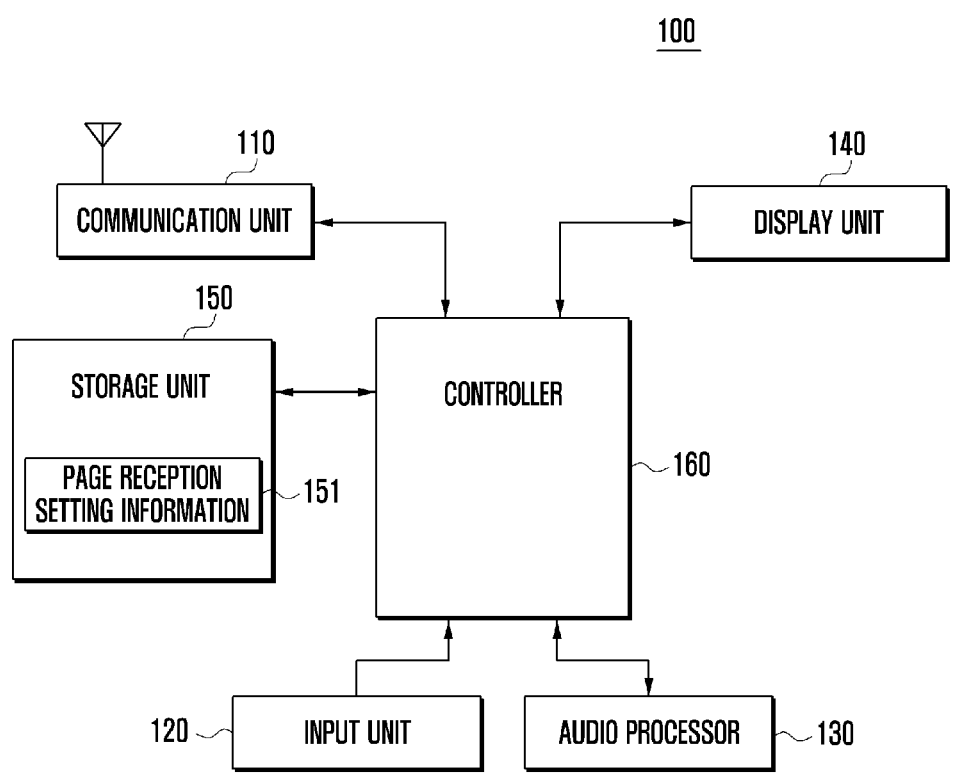
FIG. 2 is a block diagram illustrating an example configuration of a terminal of FIG. 1.

FIG. 2 is a block diagram illustrating an example configuration of the terminal 100 according to the present invention. Terminal 100 can include a communication unit 110, an input unit 120, an audio processor 130, a display unit 140, a storage unit 150, and a controller 160.

The terminal 100 having the above configuration can receive the server page by using the communication unit 110. To this end, in order to individually receive the objects included in the server page in parallel, the terminal 100 supports generation of a plurality of protocol routes and socket routes corresponding to the respective objects. Also, the terminal 100 controls reception of objects by identifying HTML data of the received page and outputting a progress bar to a screen to identify data amounts or percentages of already received objects among the objects of the page through a check of the data amounts. Accordingly, in a process of receiving and outputting the page, the terminal 100 makes reception states available to the user, and enables reception canceling of the objects included in the page, whereby the page is more rapidly implemented and output by controlling the number of objects desired to be completely received. During this process, the terminal 100 allows the user to receive only particular objects which the user requires among configurations of the page and thus supports a rapid increase in a page reception and output speed.

The communication unit 110 can support formation of a communication channel with server 200 by forming a communication channel with the communication network 300. The communication unit 110 may be implemented in a form of at least one of various communication modules which can receive the page from server 200. For example, communication unit 110 may be implemented by a WiFi module which can access server 200 through a wireless access point or a mobile communication module which can access server 200 through a mobile communication system. Particularly, the communication unit 110 according to the present invention can form an HTTP based communication channel with server 200 and receive HTML data and various objects included in the page based on the HTTP. Particularly, upon receiving HTML data including description information on various objects included in the page, the communication unit 110 decodes the received data and transmits the decoded data to the controller 160. Accordingly, before the communication unit 110 completely receives the HTML data, the controller 160 enables reception for each object according to an embodiment of the present invention with reference to the description information on the objects included in the HTML data. Alternatively, after the communication unit 110 completely receives all the HTML data, the controller 160 according to the present invention can control further reception processing for each object by using the corresponding data.

The input unit 120 has a configuration of generating various input signals required for controlling the terminal 100. The input unit 120 may be implemented by a home key, a side key, a keypad or the like, and may be implemented in a form of a touch screen or a touch panel when the display unit 140 of the terminal 100 supports a communication function. Alternatively, the input unit 120 may be implemented by a stylus pen or an electromagnetic induction pen. The input unit 120 can generate an input signal for making a request for an access to the server 200, an input signal for controlling reception of at least one object included in the server page received after the access to the server 200, an input signal for inputting information required by a particular object, an input signal for making a request for switching a page and the like. The generated input signals may be transmitted to the controller 160 to act as commands for performing functions according corresponding input intentions.

The audio processor 130 includes a speaker for supporting various audio data outputs according to an operation of the terminal 100. When the terminal 100 supports a phone communication function or a recording function, the audio processor 130 includes a microphone for collecting audio data. The audio processor 130 supports an audio data output for informing of reception of the server page, and particularly supports an output of a guide sound or effect sound for informing that the reception has been completed when there is at least one object of which reception has been completed among a plurality of objects included in the server page. Further, when reception canceling of at least one object is generated from the input unit 120 or the display unit 140 having an input function, the audio processor 130 can support a predefined audio data output according to the generation of the corresponding canceling. The support of the output of the guide sound or effect sound may be omitted according to a setup by the user.

The display unit 140 can display various screens required for operating the terminal 100. For example, the display unit 140 can output a particular web service screen accessed through the communication unit 110. That is, the display unit 140 can support an output of the server page received from the server 200. Further, when a page switching is requested according to a control by the user, the display unit 140 can support an output of a page according to the switching request. The display unit 140 is configured to include a touch panel and a display panel to support the input function as well as the display function and supports a setup of an effective area of the touch panel in accordance with various virtual key maps output to the display panel. Particularly, in the process of outputting the server page, the display unit 140 can display at least one progress bar indicating a reception state of at least one object included in the server page and overlays a setting screen which can control the reception of at least one object with a page reception state screen. Various screen interfaces provided through the display unit 140 will be described in more detail with reference to FIGS. 4-9.

The storage unit 150 can store various programs required for driving the terminal 100 according to the present invention and programs related to various functions supported by the terminal 100 and store data according to the support or operation of the corresponding program. Particularly, the storage unit 150 includes a web browser for the access to the server 200 and includes page reception setting information 151 for receiving the server page received from the server 200 in a predetermined form through the web browser.

The page reception setting information 151 includes information which predefines object parts of a server page to be received. For example, the page reception setting information 151 may include first setting information designed to allow the user to directly control reception of entire objects included in the page by identifying HTML data of the page. Further, the page reception setting information 151 may include second setting information designed such that only predefined particular objects are received among the entire objects included in the page and reception of the other objects is automatically canceled. Here, in the second setting information, limit setting information designed to be applied to only an initially received page after the function of accessing the server 200, for example, an activation of the web browser may be included in the page reception setting information 151.

Meanwhile, the page reception setting information 151 may include progress bar setting information designed to output progress bars for outputting a reception state of each received object to one area of the screen. The progress bar setting information may include setting information defining the form of the progress bars, e.g. in a form of lists corresponding to the objects; setting information defining the progress bars as distributed and placed on positions to which the objects are output; and setting information on positions to which the objects are output provided in a form of a predetermined image or icon (explained later in FIG. 8). Various examples of the page reception setting information 151 will be described in more detail with reference to FIGS. 5-9.

The controller 160 can support general signal flow related to the control of the operation of the terminal 100 and processing, transmission, storage, and management of the data. Particularly, the controller 160 can control the reception and output of the objects included in the server page according to the present invention. For this control, the controller 160 includes a configuration as illustrated in FIG. 3.

Figure 3:
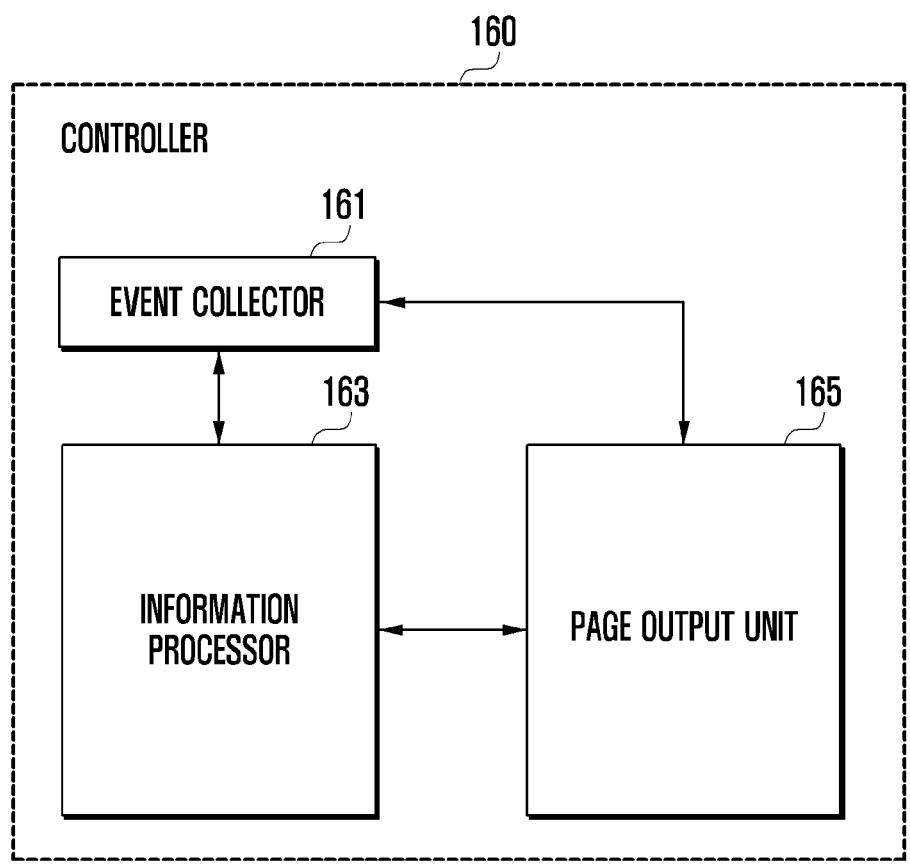
FIG. 3 is a block diagram illustrating an example configuration of a controller in the terminal of FIG. 1.

FIG. 3 is a block diagram illustrating an example configuration of the controller 160 included in the terminal 100 according to the present invention. Controller 160 can include an event collector 161, a page output unit 165, and an information processor 163.

The event collector 161 has a configuration of receiving various input signals or input events generated from the input unit 120 of the terminal 100 or the display unit 140 having the input function. Particularly, when an input event for receiving the server page is generated, the collector 161 can transmit the input event to the information processor 163. Further, when the page including a plurality of objects is output to the display unit 140 in the unit of objects, the event collector 161 can collect an input event for canceling reception of at least one object and provide the input event to the information processor 163 and the page output unit 165. In addition, the event collector 161 can receive an input event for making a request for switching a page or an input event for making a request for only receiving a particular object according to a setting of the terminal 100 and the received event can be transmitted to the page output unit 165 and the information processor 163.

The page output unit 165 has a configuration of supporting an output of the server page to the display unit 140. The page output unit 165 can support outputs of a plurality of objects to predetermined positions of the page according to a state of receiving the plurality of objects. That is, when reception of the objects of which reception is not canceled among the plurality of objects is completed, the page output unit 165 can support outputs of the corresponding objects to the display unit 140. The page output unit 165 can support outputs of a plurality of progress bars to a progress bar list screen or distributed positions which can generate input signals for identifying the reception state of each object and canceling the reception. Further, the page output unit 165 can support an output of a screen where reception of a particular object is automatically canceled to the display unit 140 according to a setting. Meanwhile, when the input event for switching a page is generated, the page output unit 165 can receive the switched page received by the information processor 163 and support an output of the page to the display unit 140.

The information processor 163 can transmit a request for receiving the server page according to the received input event collected by the event collector 161 and each object of the received server page to the page output unit 165. In order to receive a plurality of objects in parallel, the information processor 163 supports generation of a plurality of protocol routes and socket routes corresponding to the plurality of objects included in the corresponding server page. Further, when the objects are completely received, the information processor 163 collects the corresponding protocol routes and socket routes, and supports re-allocation of the collected routes or generation of new protocol routes and socket routes when reception of new objects are requested. The information processor 163 can provide support such that only a predefined particular object is received among the plurality of objects included in the particular server page and reception of the remaining objects is automatically canceled. Further, when the reception of the particular object is designated during the reception of the plurality of objects, the information processor 163 can command automatic cancelling reception of the remaining objects except for the designated object. Alternatively, the information processor 163 commands that only reception of a particular object designated by the user is canceled while a plurality of objects are received. Meanwhile, when all the objects included in the page are completely received, that is, when the remaining objects except for at least one object of which reception has been requested to be canceled are completely received, the information processor 163 can construct the page with the received objects and transmit the page to the page output unit 165. At this time, the information processor 163 places the objects on original positions to which the objects are to be located and outputs the objects, where areas corresponding to objects having reception canceled are processed as empty areas. Alternatively, the information processor 163 identifies sizes of the received objects to re-control placement positions, constructs a new page, and then transmits the new page to the page output unit 165. Alternatively, the information processor 163 commands that objects of which reception has been completed among all the objects included in the page are first displayed.

Figure 4:
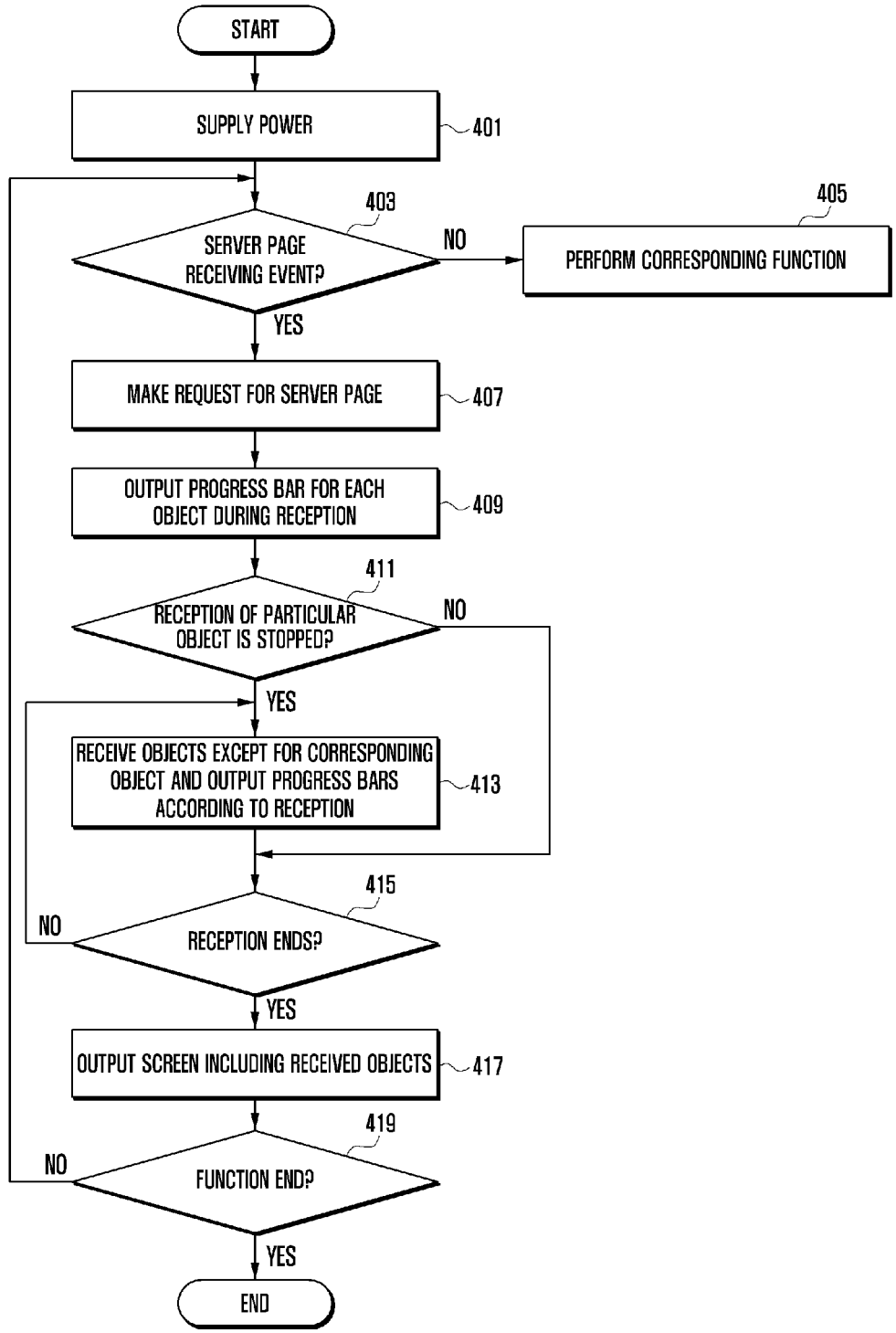
FIG. 4 is a flowchart for describing a terminal operating method for receiving and displaying a server page according to an embodiment of the present invention.

FIG. 4 is a flowchart for describing a terminal operating method for receiving and displaying the server page according to an embodiment of the present invention. The various operations of the method ("process") are controllable by controller 160. Power for driving components is initially supplied (step S401). Thereafter, when an input event is generated from the input unit 120 or the display unit 140 having the input function, the process identifies (step S403) whether the corresponding input event is an input event for receiving the server page. If not, the process at step S405 supports performance of a function according to a corresponding input event. For example, the terminal 100 can support performance of a function of reproducing a selected file, a function of editing a file, a function of transmitting a file and the like.

Meanwhile, when the input event for receiving the server page is generated in step S403, the controller 160 proceeds to step S407 and transmits a request for the server page to server 200. Next, the process outputs a progress bar for each object while the server page is being received in step S409. Here, the progress bar for each object may be provided in various forms such as a list form, a distributed form and the like as described above. An item selectable to request canceling reception of the corresponding object may be provided to each progress bar and an item selectable to request canceling reception of all the objects may be also provided to one area of the screen.

Next, the method identifies whether an input event for stopping reception of a particular object is generated in step S411. Here, when the input event for stopping reception of the particular object is generated, reception of objects except for the corresponding object is enabled at step 413, and a progress bar is output according to the reception. Alternatively, an information item such as "reception stopped" is displayed with respect to the item of which reception is stopped while outputting progress bars of all the objects.

Thereafter, the method identifies whether an event for ending the reception is generated in step S415. Here, the reception ending may correspond to reception completion of the objects except for the objects of which reception has been canceled by the user among the objects included in the server page. When the reception ending of the objects is not generated in step S415, the method proceeds to steps before step S411 for repeating the succeeding steps. When the reception ending event of the objects is generated in step S415, the flow proceeds to step S417 and controls an output of a screen including the received objects. Here, when reception states of particular objects correspond to temporary stopping due to an error of the communication network 300, the controller 160 can perform a predefined standby for a predetermined time. When the predetermined time passes, the controller outputs a reception failure message of the server page and the process of receiving the server page ends. Alternatively, the controller 160 outputs a reception failure message of the objects which have not been received until the predetermined time passes and proceeds to step S417 in which a screen is configured with the already received objects and then output. Here, the reception failure message may be output to positions to which the corresponding objects are output.

Meanwhile, the method identifies whether an event for ending a function of the terminal 100 is generated in step S419. If not, steps before step S403 are repeated.

As described above, the server page operating method and the terminal supporting the same according to an embodiment of the present invention control the reception of the server page on the basis of objects. Accordingly, the reception of the server page can be controlled in a form desired by the user and the server page can be more rapidly received and output according to a control.

Further, the server page operating method according to the present invention may enables receipt of the server page including a plurality of object address information. In some embodiments, progress bars individually indicating each progress state when a plurality of objects are received are output to positions on the server page.

FIGS. 5-9 are screen examples describing respective operations by the terminal 100 for receiving and displaying a server page. In the following description, it is assumed that the various processes are performed under the control of controller 160.

Figure 5:
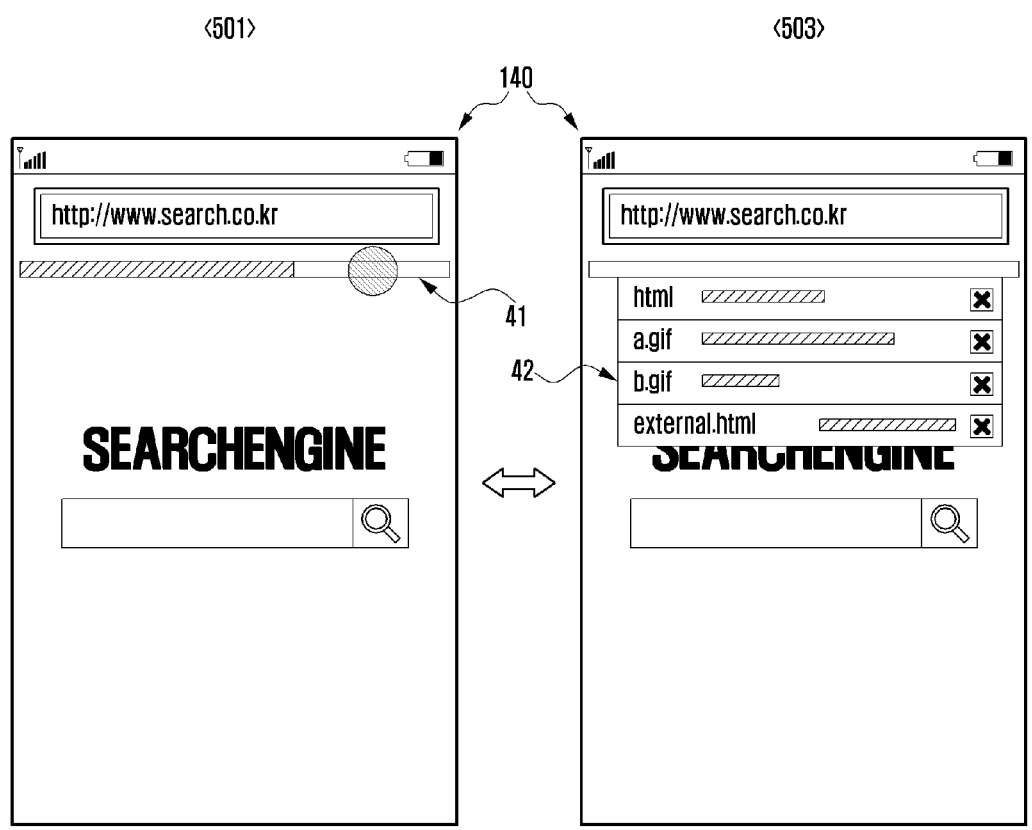
FIG. 5 illustrates an example of a first server page providing screen according to an embodiment of the present invention.

FIG. 5 is a first screen example for describing an operation involving the server page according to an embodiment of the present invention. When the user makes a request for an access to the particular server 200 by controlling the terminal 100, the terminal 100 forms a communication channel with server 200 connected to the communication network 300 based on the communication unit 110 in response to the request by the user. Further, after the request for the access to the server 200, the terminal 100 begins to receive the server page from server 200 and begins outputting the page to the display unit 140 as illustrated in a screen 501. In the screen 501, an example of a particular web (Internet) page using HTTP is shown. Particularly, the terminal 100 can output an "entire progress bar" 41 to one region of the screen in order to show a degree of page loading while receiving the page. The entire progress bar 41 has a configuration of showing a degree of the entire data of the page when finally received, i.e., an indication of the amount of page data already received to the entire amount of page data when finally received. Since the speed at which the data is processed in terminal 100 is negligible compared to the rate at which it is received, the progress form is changed essentially according to the degree of reception of the page. The controller 160 of terminal 100 identifies HTML data included in the page to identify sizes of all the objects included in the page in order to express the entire progress bar and then configures the entire progress bar 41. Further, as illustrated in FIG. 5, the entire progress bar 41 can be output to one side of the screen, for example, an upper end of the screen. At this time, as described above, the provided entire progress bar 41 shows reception amounts of all the objects regardless of a reception amount of each object. When each object is received by the terminal 100 during a process of providing the page, protocol routes and socket routes are formed on the basis of objects. That is, each object is assigned a specific socket route or protocol route which is used for reception of that object. Accordingly, the controller 160 can calculate reception amounts to be applied to the entire progress bar 41 by combining the reception amounts of the objects transmitted through the routes.

In certain embodiments, the user generates an input event for loading "partial progress bars," which are progress bars for particular objects (and equivalently referred to as "object progress bars"). Terminal 100 can support output of the partial progress bars 42 to one side of the screen as illustrated in a screen 503. For example, when a touch event is generated on an area of the entire progress bar 41 in the screen 501, it can be identified as the input event for loading partial progress bars 42. The partial progress bars 42 may be output to replace the entire progress bar 41, output to be overlaid with the entire progress bar 41, output to an area adjacent to an area to which the entire bar 41 is output, or output to a predetermined area. For example, in a screen

503, the partial progress bars 42 are placed in an upper end of the screen. Alternatively, they can be placed in a center of the screen or a lower end of the screen, or displayed in a form of at least two separated lists as desired.

The partial progress bars 42 show reception states of the objects included in the server page. For example, when the page is configured with three objects, e.g., when "a.gif, b.gif, and external. HTML" are displayed in a predetermined position, the partial progress bars 42 may show reception states of the objects as illustrated in screen 503. Here, HTML data may include information related to all the objects as server page related HTML information. The controller 160 identifies all objects to be received by identifying at least a part of HTML data received before the reception of all HTML data and determines the number of object elements to be represented by the partial progress bars 42 as illustrated in FIG. 5. Further, a progress state display is controlled by identifying amounts of the objects transmitted through the protocol routes and the socket routes during the process of displaying the partial progress bars 42. In addition, information identified in the process of identifying the HTML data may be displayed. For example, template information included in the HTML data can be identified and applied to the page. Here, the template information may be information on sections of areas to which the objects are output.

Meanwhile, when the user generates the input event for canceling the outputs of the partial progress bars 42, the screen display may change to the previous screen 501. Here, the input event may be an event or the like for selecting a back button, a home button or a separately provided icon item to cancel the partial progress bar 42.

In addition, the partial progress bars 42 can support a direct control to cancel reception of each object through "x" boxes or the like corresponding to reception canceling items placed on areas to which object items are output as illustrated in FIG. 5. That is, when the user selects the "x" boxes, reception of the corresponding object items are canceled, thereby closing the sockets of those objects.

Meanwhile, respective items of the partial progress bars 42 may be displayed with different colors according to the objects. Accordingly, the user can more easily recognize distinction between the progress bars. Further, orders of the object items displayed on the partial progress bars 42 may vary depending on data sizes of the items. For example, the object item having a relative large data size may be placed in a lower side of the partial progress bars 42 and the object item having a relatively small data size may be placed in an upper side of the partial progress bars 42 or vice versa. Further, the object item having a data size equal to or smaller than a predetermined size may be completely received quickly due to rapid reception thereof, so that object items corresponding to the data size equal to or smaller than the predetermined size may be set not to be included in the items of the partial progress bars 42.

Figure 6:
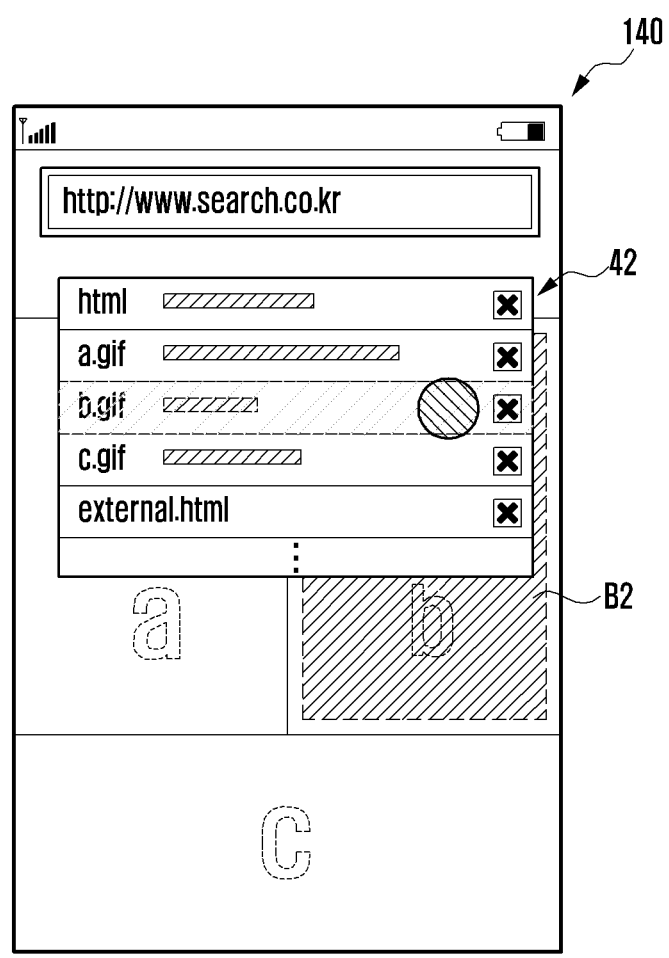
FIG. 6 illustrates an example of a second server page providing screen according to an embodiment of the present invention.

FIG. 6 is a second screen example for describing an operation involving the server page according to an embodiment of the present invention. In this implementation, object areas (e.g., "a", "b", "c") associated with the objects of the partial progress bars 42 are displayable.

More specifically, partial progress bars 42 are displayed in a process of receiving the server page as illustrated in FIG. 6. At this time, when an input command for selecting a particular object item of the partial progress bars 42, for example, a B object item (b.gif) is generated, a B object output area B2 is displayed, corresponding to a position where the B object (b.gif) is placed on the page area, in a manner distinguished from other object areas. For example, when the user generates a touch event for selecting the B object (b.gif) on the partial progress bars 42, a color of a display area of the B object output area B2 corresponding to the B object (b.gif) is changed. Alternatively, the B object output area B2 is output with a color different from colors of neighboring areas, or a particular display effect is applied to the B object output area B2.

Accordingly, the controller 160 collects template information on placement positions of the objects included in the server page screen and position information of each object to be output to each area of the template from the HTML data. Further, when a particular item is selected from the partial progress bars 42, the controller 160 can identify an object output area corresponding to the selected item. Through the identification, the user can more easily identify which position each object is to be output to.

Meanwhile, when the server page includes a larger number of objects, the partial progress bars 42 can show additional objects as well as the objects provided through the current partial progress bars 42, and accordingly support a scrolling function. When the user performs an operation for generating a scroll event on the partial progress bars 42, other objects can be output to the partial progress bars 42 by performing a screen scroll according to the corresponding scroll event.

Figure 7:
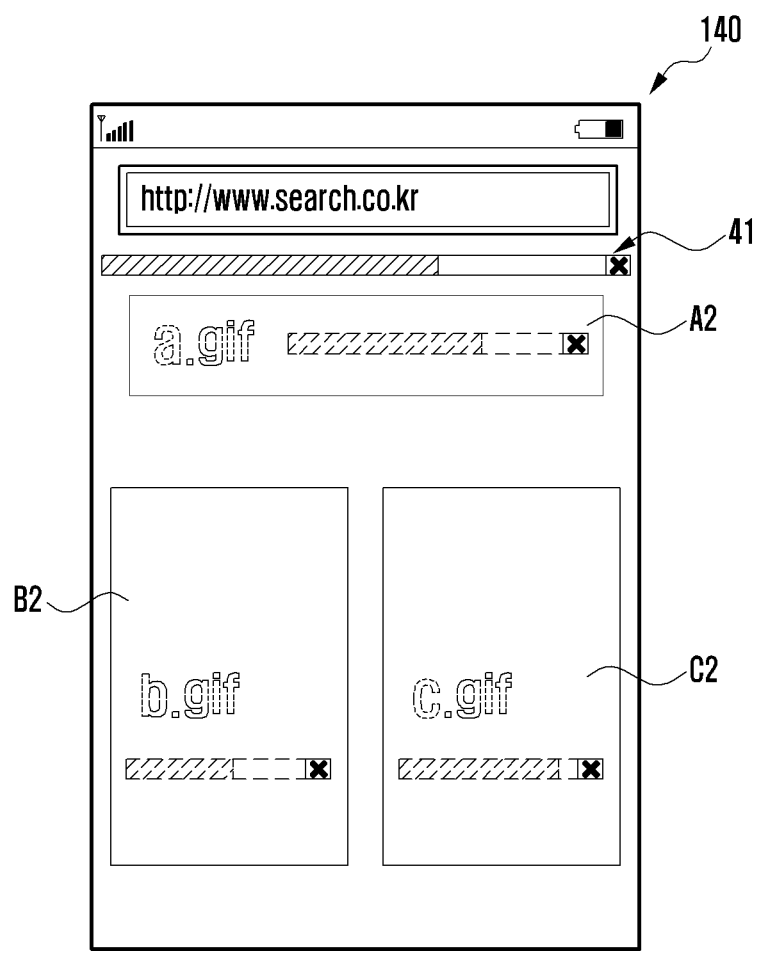
FIG. 7 illustrates an example of a third server page providing screen according to an embodiment of the present invention.

FIG. 7 is a third screen example for describing an operation involving the server page according to still another embodiment of the present invention. In this implementation, access to the server 200 is initiated according to a request of the user or preset scheduling information, and the page is received therefrom. At this time, the terminal 100 can support simultaneous outputs of the entire progress bar 41 and the partial progress bars according to a setting as illustrated in FIG. 7. At this time, the entire bar 41 may be placed in one area of the screen, for example, an upper end of the screen. Here, the entire progress bar 41 can output an item which can cancel all contents of the corresponding server page to a predetermined area of the corresponding area, for example, a right edge area of the progress bar. Accordingly, when a progress canceling button included in the entire progress bar 41 is activated, reception of all contents of the server page is postponed or canceled. That is, when the user generates a touch event for selecting an "x" box placed in a right edge of the entire progress bar 41, the controller 160 determines that an input event for stopping the reception of the corresponding server page is generated and commands that the reception of the server page is stopped.

Meanwhile, the display unit 140 can place and display objects included in the server page in predetermined areas as illustrated in FIG. 7. Accordingly, the controller 160 identifies HTML data to identify all template information of the server page and supports an output of information related to corresponding objects to predetermined areas defined by the template. For example, when the server page includes three objects such as an A object (a.gif), a B object (B.gif), and a C object (c.gif)", the A object (a.gif) related information is placed in an upper end of the screen, B object (b.gif) related information is placed in a left side of the screen, and C object (c.gif) related information is placed in a right side of the screen. Concurrently, the partial progress bars showing reception states of the corresponding objects may be displayed on object output areas A2, B2, and C2. The "x" boxes for canceling reception of the corresponding objects may be placed together with images showing reception states of the corresponding objects in the partial progress bars displayed on the object output areas A2, B2, and C2. Accordingly, when the user selects the "x" box placed on the partial progress bar of a particular object, reception of the corresponding object is canceled. Here, for the output area of the object of which reception is canceled, an empty area may be output without any information output, a predefined message, for example, a message of "area of which reception is canceled" may be output, or at least one of an icon, an image, a special symbol, and a text indicating a reception canceled state may be output.

In FIG. 7, an output state of the C object (c.gif) on the C object output area C2 is shown as the reception of the object in the C object output area C2 becomes completed. Accordingly, the user can view contents of the C object (C.gif) of which reception is first completed. Further, at least one reception of the A object (a.gif) and the B object (b.gif) may be canceled according to a selection of the user. Meanwhile, when at least one reception of the A object (a.gif) and the B object (b.gif) is not completely received within a predefined time or the reception of the object does not progress, the reception may be automatically canceled for each area. Further, in an area where the reception is automatically canceled, an empty area may be displayed or a message of "corresponding object reception has failed" or the like, or an image corresponding to the message may be output.

Figure 8:
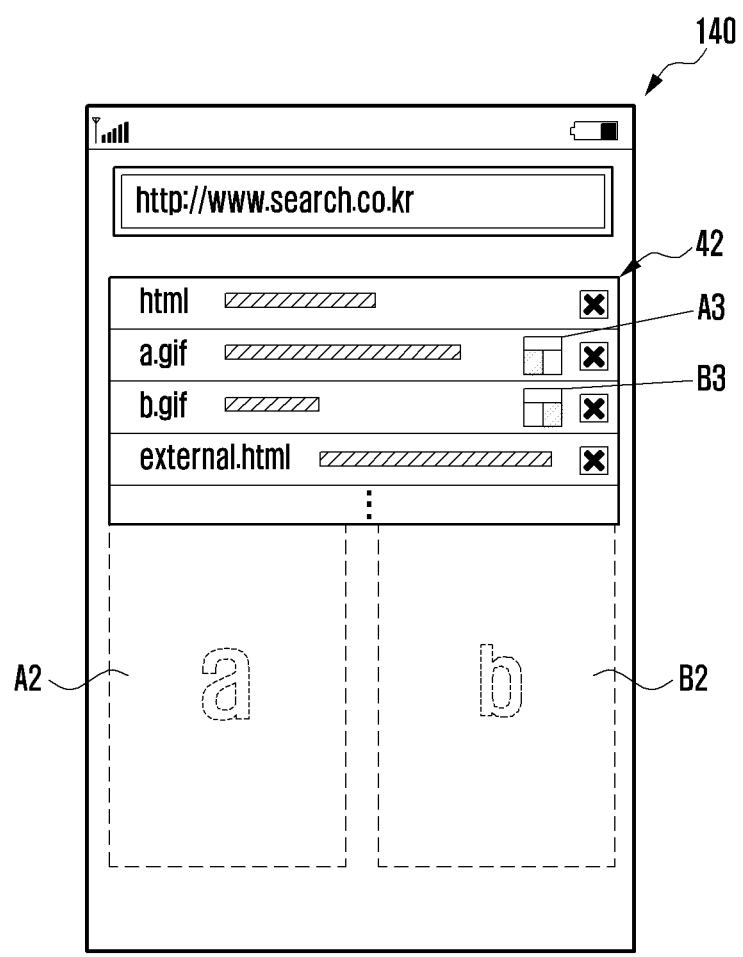
FIG. 8 illustrates an example of a fourth server page providing screen according to an embodiment of the present invention.

FIG. 8 is an example screen illustrating an operation involving a server page according to an embodiment of the present invention. When a request for displaying a particular server page is generated according to a control of the user or according to predefined scheduling information, the terminal 100 accesses the server 200 which supports provision of the corresponding page. Further, the terminal 100 can make a request for receiving the page to the server 200 and receive information which configures the page from the server 200.

During this process, the terminal 100 can partially receive objects included in the page in parallel, and accordingly, items corresponding to objects (HTML, a.gif, b.gif, and external.HTML) may be displayed on the partial progress bars 42 as illustrated in FIG. 8. As the partial progress bars 42, the progress bar image showing the reception state of each object may be output in a similar manner as that illustrated and described previously for the screen 503 of FIG. 5, and the progress bar image may indicate an amount of the corresponding object which has been received.

Particularly, the present embodiment allows an easy identification of which object is located at which location of a page screen by providing output area icons A3 and B3 to one side of the partial progress bars 42 as illustrated in FIG. 8. For example, the A output area icon A3 may be placed in a right area of the partial progress bars 42 where the A object (a.gif) is placed. The A output area icon A3 may be provided in a form indicating that the corresponding A object (a.gif) is to be output to the A object output area A2 of the server page (as illustrated by the shaded, bottom left side box within the icon, representing that area A2 is on the bottom left hand side of the overall screen). The B output area icon B3 may be placed in a right area of the partial progress bars 42 where the B object (b.gif) is place in the same way. The B output area icon B3 may be provided in a form indicating that the B object (b.gif) is to be output to the B object output area B2.

In one implementation, a control option is available in which only an object to be output to a particular position is automatically received and the remaining objects are automatically canceled according to a prearranged setting. For example, when only the A object output area A2 is set as an effective area, only the A object (a.gif) corresponding to the A object output area A2 is received and output and reception of the B object (b.gif) is automatically canceled when the page is received and output.

In another implementation, regardless of the manner in which the partial progress bars 42 are displayed, reception of an object having a size equal to or larger than a predetermined data size is automatically canceled and an object having a size smaller than the predetermined data size is received and used to configure the server page. In still another embodiment option, reception of an object within a predetermined size range is automatically canceled and an object which is not within the predetermined size range is received and output. Such a function may be used to support a case where the user receives and desires to read only predetermined information without receiving an advertisement object by applying the function to the advertisement object within a predetermined range included in the page. In yet another embodiment option, reception of an object equal to or smaller than a predetermined data size is automatically canceled, such that only objects within a predetermined size range are received, and reception of objects having sizes outside the predetermined size range is automatically canceled.

Figure 9:
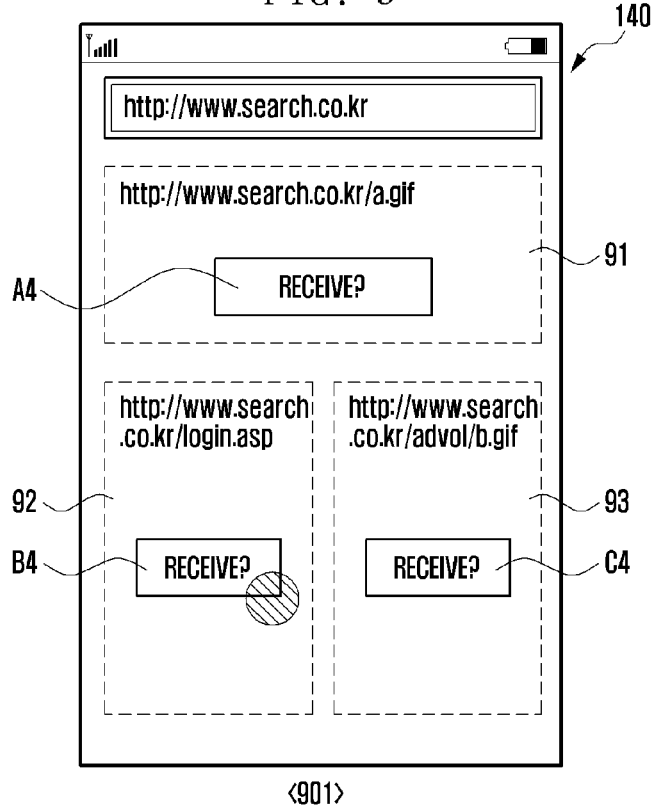
FIG. 9 illustrates an example of a fifth server page providing screen according to an embodiment of the present invention.
Figure 9:
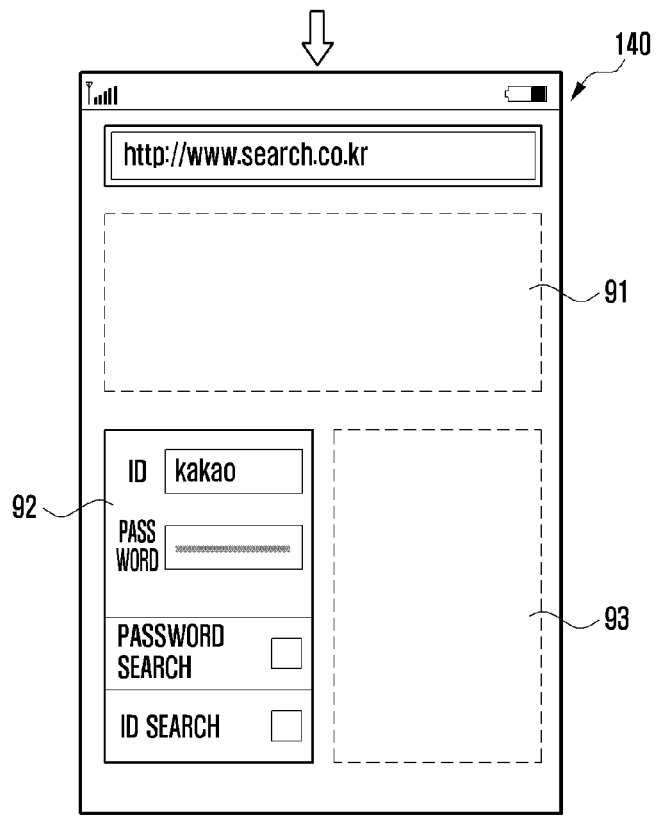

FIG. 9 illustrates example screens for describing an operation involving a server page according to still another embodiment of the present invention. This embodiment allows the user to select a particular object to be completely received, while canceling or postponing reception of all other objects of the page. When receiving the server page including a plurality of objects from the server 200, the controller 160 can identify the number of objects and sizes of the objects by identifying at least a part of the HTML data which describes the plurality of objects included in the page. Further, the positions where the objects are placed are identifiable according to a setting by the user based on template information and placement information of the objects, and a screen displaying objects to be received is displayed as illustrated in a screen 901. In the example, while the objects of the page are only partially or minimally received, a reserve screen associated with three objects 91, 92, and 93 is output to the display unit 140 through an identification of corresponding data during the process of receiving the HTML data included in the page. Further, a plurality of reception items A4, B4, and C4 which can be selected by the user via touch screen input or the like to command reception of at least one of the objects 91, 92, and 93 are output to areas to which the corresponding objects 91, 92, and 93 are output. For instance, the reception items A4, B4 and C4 have a prompt such as "Receive?" informing the user that reception of the associated object is available via selection. At least one of a name of the corresponding object, URL address information, and entire data size information of the corresponding object can be displayed on the areas to which the objects 91, 92, and 93 are output. Note that in the example of FIG. 9, only the URL address is displayed. Alternatively, the name of the corresponding object, the URL address information, and the entire data size information of the corresponding object may be displayed on the object items. It is noted that above mentioned information (the name, the URL address information, the entire data size information of the corresponding object) could also be displayed when the partial progress bars 42 in the list form as described in FIG. 5 are output.

In one implementation, when the user selects a B object reception item B4 on the screen 901, reception of the B object is prioritized over the other objects. For instance, reception of the B object is allowed to continue while the reception of the non-selected objects is automatically canceled. Preferably, a predetermined time interval after the selection of the B object is provisioned to allow the user to select at least one other item(s) for reception, for example, the A object reception item A4 as well as the B object reception item B4. When the predetermined time passes, the remaining objects which have not been selected can be automatically canceled and only the selected objects are received.

Meanwhile, when only a single reception item such as B4 is selected, the B4 object associated with that reception item is output to a corresponding area as illustrated in a screen 903. That is, the B4 object 92 can be output to a lower left side of the display unit 140. In the example, object 92 may be a login object, and accordingly the user can effectively command that only the login object is received without receiving all other objects when commencing reception of the server page. Device 100 can then suitably detect user input of the login information to access the server 200 through the corresponding login object.

Meanwhile, since the login object may be set to have a relatively smaller data capacity in comparison with other objects, reception of the login object may be completed relatively earlier in comparison with other objects. Then, the controller 160 provides support such that the login object of which the reception is completed is first output to one side of the display unit 140 and reception of the remaining objects except for the login object is automatically canceled when an input event for selecting the corresponding login object is generated. The above operations for the login object can likewise be applied to various other selected objects of the page. For example, in a process of receiving the page including a total of six objects, when three objects have been completely received and the remaining three objects are still being received, an input event for selecting at least one object of the already received three objects may be generated. Here, the input event automatically cancels the reception of the remaining three objects. As a result, the page may be formed by the already received three objects.

In the above describe, several approaches to displaying object-related items of an incoming page have been presented. These include: 1) partial progress bars displayed with different colors; 2) differently displaying placement orders of the partial progress bars according to data sizes of the object items, when an input signal for selecting or (e.g. highlighting) a particular object item included in the partial progress bars is generated; 3) displaying an object output area corresponding to a position on an actual page area to be distinguished from other areas, and 4) displaying a name of the corresponding object, 5) displaying URL address information; or 6) displaying entire data size information of the corresponding object in areas to which the items of the partial process bars or the objects are to be output. According to a particular terminal 100 design, only one, some or all of the above six display techniques may be provisioned. As described above, in receiving and displaying the server page, the method of operating the server page and the terminal supporting the same according to an embodiment of the present invention can enable reception of at least one object to be canceled based on a particular process of the various processes desired by the user. That is, the present invention achieves a more rapid output of the server page by canceling at least one reception operation of the objects included in the server page or controlling capacities of data to be received after the reception thereof is allowed according to a setting or control of the user.

Meanwhile, the terminal may further include various additional modules according to provision forms thereof. For instance, when the terminal is a communication terminal, the terminal may further include components which have not been mentioned above, such as a short distance communication module for short distance communication, an interface for data transmission/reception by a wired communication scheme or a wireless communication scheme of the terminal, an Internet communication module for communicating with an Internet network to perform an Internet function, and a digital broadcasting module for performing a function of receiving and reproducing digital broadcasting. Many other modules to achieve various other functionality may be included. Further, it is apparent that particular components in the embodiments described above can be excluded or replaced with other components. This will be easily understood by those skilled in the art.

In addition, the terminals according to an embodiment of the present invention may include all information technology devices and multimedia devices such as a Portable Multimedia Player (PMP), a digital broadcasting player, a Personal Digital Assistant (PDA), a music player (for example, an MP3 player), a portable game terminal, a smart phone, a notebook, and a handheld PC and application devices thereof as well as all mobile communication terminals operating based on communication protocols corresponding to various communication systems.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the exemplary embodiments described herein have been particularly shown and described with reference to particular examples thereof, it will be understood by those of ordinary skill in the art that various changes in form and details may be made therein without departing from the spirit and scope of the invention as defined by the following claims.

What is claimed is:
1. An electronic device comprising:
   a communication unit configured to receive a plurality of objects included in a server page;
   a display unit to display partial progress bars respectively showing reception progress states of the plurality of objects as they are received, and at least one item identifying each of the plurality of objects; and a controller to:

generate each of the partial progress bars by extracting at least a part of received Hypertext Markup Language (HTML) data describing the plurality of objects and controlling the display unit to display an individual reception state of each of the plurality of objects through the partial progress bars, and control the display unit to display output area icons in at least two partial progress bars, the output area icons each representing a location in the server page where objects corresponding to each of the at least two partial progress bars are to be displayed, wherein the display unit is configured to display reception canceling items within each of the displayed partial progress bars, each reception cancelling item selectable to cancel reception of an associated object of the plurality of objects, the output area icons each comprising a thumbnail image including respective regions representing each of the plurality of objects to be displayed within the server page, and the location is indicated in each of the output area icons by highlighting one of the respective regions of each of the output area icons with a different color.

2. The electronic device of claim 1, wherein the display unit is configured to display the partial progress bars in: i) a list format in association with items of the plurality of objects, or ii) a distributed format in which the partial progress bars are displayed in areas on the server page to which the plurality of objects are to be output.

3. The electronic device of claim 1, wherein the controller is further configured to control receiving at least one of the plurality of objects according to at least one of a predefined setting, a designation of a user, and a data size of the at least one of the plurality of objects.

4. The electronic device of claim 1, wherein the controller is configured to automatically cancel reception for a particular object when reception of the particular object is not completed within a predefined time, or has not progressed for the predefined time.

5. The electronic device of claim 1, wherein the display unit is configured to display at least one of:

different colors for each of the partial progress bars according to each of the plurality of objects, and different placement orders for items of each of the partial progress bars according to each of the plurality of objects.

6. A method of receiving and displaying a server page, the method comprising:

receiving the server page including a plurality of objects;

configuring and displaying progress bars each indicating download progress for each of the plurality of objects, the progress bars each displayed on a respective portion of the server page to which each of the plurality of objects are to be displayed when fully downloaded, the progress bars configured based on information for each of the plurality of objects by identification via at least a part of received Hypertext Markup Language (HTML) data describing the plurality of objects; and displaying an individual reception state of each of the plurality of object through the progress bars, and reception canceling items within each of the displayed progress bars, each reception cancelling item selectable to cancel downloaded of an associated object of the plurality of objects, wherein at least two partial progress bars include output area icons each representing a location in the server page where objects corresponding to each of the at least two partial progress bars are to be displayed, the output area icons each comprising a thumbnail image including respective regions representing each of the plurality of objects to be displayed within the server page, and the location is indicated in each of the output area icons by highlighting one of the respective regions of each of the output area icons with a different color.

7. The method of claim 6, wherein at least one of the plurality of objects included in the server page are received according to at least one of a predefined setting, a designation of a user, and a data size of the at least one of the plurality of objects.

8. The method of claim 6, wherein receiving the server page further comprises automatically cancelling reception of an object of the plurality of objects which has not been completely received with a predefined time or for which reception has not progressed for the predefined time.

9. The method of claim 6, wherein displaying the individual reception state comprises displaying colors and placement orders of items of the progress bars according to each of the objects.

10. A method of receiving and displaying a server page, the method comprising:

receiving a plurality of objects included in the server page for displaying the server page;

configuring and displaying partial progress bars each indicating download progress for each of the plurality of objects by identifying at least a part of received Hypertext Markup Language (HTML) data describing the plurality of objects; and displaying the download progress of each of the plurality of objects through the progress bars, each progress bar including a reception canceling item displayed therein, the reception cancelling item selectable to cancel reception of an associated object of the plurality of objects, wherein at least two partial progress bars include output area icons each representing a location in the server page where objects corresponding to each of the at least two partial progress bars are to be displayed, and wherein the output area icons each comprise a thumbnail image including respective regions representing each of the plurality of objects to be displayed within the server page, and the location is indicated in each of the output area icons by highlighting one of the respective regions of each of the output area icons with a different color.

11. The method of claim 10, wherein displaying the partial progress bars comprises at least one of:

displaying the partial progress bars in a list form in accordance with each of the plurality of objects; and displaying each of the partial progress bars in areas of the server page to which associated objects of the plurality of objects are to be displayed.

12. The method of claim 11, wherein displaying the partial progress bars in the list form in accordance with each of the plurality of objects comprises displaying information in the areas to which the plurality of objects are to be displayed in a form of a predetermined image or an icon.

13. An electronic device, comprising:

a communication unit receiving a server page including a plurality of objects; and a display unit outputting:

progress bars, each progress bar indicating download progress for each of the plurality of objects, and displayed to positions in the server page to which each of the plurality of objects are to be displayed, output area icons in at least two of the partial progress bars, the output area icons each representing a location in the server page where objects corresponding to the at least two of the partial progress bars are to be displayed, and reception canceling items within the displayed progress bars, each reception cancelling item selectable to cancel reception of an associated object of the plurality of objects, wherein the output area icons each comprise a thumbnail image including respective regions representing each of the plurality of objects to be displayed within the server page, and the location is indicated in each of the output area icons by highlighting one of the respective regions of each of the output area icons with a different color.

14. The electronic device of claim 13, wherein the display unit displays at least one of:

different colors for each of the progress bars according to each of the plurality of objects, and different placement orders for items of each of the progress bars according to each of the plurality of objects.

15. The electronic device of claim 13, further comprising a controller, wherein the progress bars are displayed on the display unit based on information on each of the plurality of objects via identification of at least a part of HTML data describing the plurality of objects while receiving the plurality of objects, and displaying an individual reception state of each of the plurality of objects through the progress bars.

16. The electronic device of claim 15, wherein the controller further controls to receive at least one of the plurality of objects included in the server page according to at least one of a predefined setting, a designated of a user, and a data size of the server page.

17. The electronic device of claim 15, wherein the controller automatically cancels reception for a particular object when the particular object is not completely received with a predefined time or reception of an object has not progressed for the predefined time.

18. The electronic device of claim 1, wherein the partial progress bars are displayed on the display unit in a menu overlapping at least some of the regions in the server page where the plurality of objects are to be displayed, the controller further configured to:

in response to detecting a selection of a particular partial progress bar of the displayed partial progress bars from the overlapping menu, control the display unit to a region of the server page corresponding to the particular progress bar with a color different than other regions of the server page.

* * * * *